(12) United States Patent
Hsieh et al.

(10) Patent No.: US 8,171,129 B2
(45) Date of Patent: May 1, 2012

(54) SMART ENDPOINT AND SMART MONITORING SYSTEM HAVING THE SAME

(75) Inventors: Shyi-Shing Hsieh, Taipei (TW);
Chin-Chung Nien, Hsinchu (TW);
Vincent Kuo, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 303 days.

(21) Appl. No.: 12/061,654

(22) Filed: Apr. 3, 2008

(65) Prior Publication Data
US 2009/0216876 A1 Aug. 27, 2009

(30) Foreign Application Priority Data
Feb. 22, 2008 (TW) ................. 97106238 A

(51) Int. Cl.
*G06F 15/173* (2006.01)

(52) U.S. Cl. ........................................ 709/224

(58) Field of Classification Search .................. 709/233, 709/221–249; 370/252, 389, 238; 705/14
See application file for complete search history.

(56) References Cited

U.S. PATENT DOCUMENTS

| 2003/0197612 A1* | 10/2003 | Tanaka et al. ............... 340/572.1 |
| 2004/0118916 A1* | 6/2004 | He ................................. 235/383 |
| 2006/0064477 A1* | 3/2006 | Renkis ........................... 709/223 |
| 2007/0135978 A1* | 6/2007 | Kim et al. ......................... 701/29 |
| 2007/0229278 A1* | 10/2007 | Nagata et al. .............. 340/572.7 |
| 2008/0249859 A1* | 10/2008 | Angell et al. .................... 705/14 |

* cited by examiner

*Primary Examiner* — Joseph Avellino
*Assistant Examiner* — Mark O Afolabi
(74) *Attorney, Agent, or Firm* — Jianq Chyun IP Office

(57) ABSTRACT

A smart endpoint and a smart monitoring system having the smart endpoint are provided. The smart endpoint includes a central processing unit (CPU), an interface module, a digital signal processing unit, and a memory module. The interface module is coupled to the CPU for receiving a plurality of heterogeneous monitoring signals and an identification code. The digital signal processing unit is coupled to the CPU for integrally considering the monitoring signals and the identification code to determine an abnormal event, and generate an abnormal event data thereby. The memory module is coupled to the CPU for recording the abnormal event data. As such, the present invention is adapted to determine an occurrence of an abnormal event, by which the passive monitoring can be upgraded to an active monitoring and analyzing, and thus achieving a smart monitoring.

6 Claims, 3 Drawing Sheets

SMART ENDPOINT AND SMART MONITORING SYSTEM HAVING THE SAME

CROSS-REFERENCE TO RELATED APPLICATION

This application claims the priority benefit of Taiwan application serial no. 97106238, filed on Feb. 22, 2008. The entirety the above-mentioned patent application is hereby incorporated by reference herein and made a part of specification.

BACKGROUND OF THE INVENTION

1. Field of the Invention

The present invention generally relates to monitoring systems, and more particularly, to a smart endpoint and a smart monitoring system having such a smart endpoint.

2. Description of Related Art

Although most published so called smart video monitoring systems, e.g., IBM Smart Surveillance System (S3), have functions, such as identity tracking, location tracking, and activity tracking, and many technical components (or modules) for interpreting video data captured by video cameras by referring to historical background data. However, these functions and technical components are almost all developed individually and independently. As such, it is very hard to combine the individual technical components for the video monitoring system to achieve a complete sensibility to the ambient.

Besides, conventional video monitoring systems typically transmit video data captured by front side cameras to backside servers, and execute data processing with the backside servers. However, this increases the load of data processing at the backside servers, and delay the time of processing. As such, the increased load and the delayed time will affect seriously the performance of a system which is configured for providing an instant (or real time) monitoring. Further, a typical video monitoring system equipped with only a video camera exhibits a restricted behavior identification function to whom being monitored. In other words, without being assisted by other sensing technologies, such as radio frequency identification (RFID), biometrics, detection of smoke, temperature, vibration, motion, sound, gas, and light, for increasing the overall monitoring capability of the system, as well as the sensing data processing capability of the system at the front end, it would be very difficult to achieve a high reliable video security monitoring system with all functionality executed thereby.

As the demand for accurate video monitoring systems increasing, the construction of the system fundamental environment for the video monitoring systems gradually turns to consider digital monitoring systems. In order to manage the giant amount of video sensing data collected by the image monitoring systems, so as to perform the retrieval of object images and achieve the function of providing instant or real time warning messages, the monitoring systems would be definitely developed to be smart. Further, to strengthen the identification capability of the monitoring system to the subject being monitored, and improve the sensing data processing capability of the monitoring system at the front end so as to shorten the processing time used by the system in data processing have become key roles in achieving a high reliable video security monitoring system with all functionality executed thereby. Even further, the current video monitoring systems can passively perform monitoring and video recording, and can not actively find out or determine abnormal or unusual events, and therefore cannot provide instant warning message to the users.

As such, for at least the foregoing reasons, it is desirable to provide a smart monitoring system having a smart endpoint.

SUMMARY OF THE INVENTION

Accordingly, the present invention is directed to a smart endpoint and a system having the same. The smart endpoint and the system having the same are adapted for integrating a heterogeneous sensor, e.g., an RFID or other biometrics, which is other than cameras, to a video monitoring system.

The present invention provides a smart endpoint, including a central processing unit (CPU), an interface module, a digital signal processing unit, and a memory module. The interface module is coupled to the CPU for receiving a plurality of heterogeneous monitoring signals and an identification code. The digital signal processing unit is coupled to the CPU for integrally considering the monitoring signals and the identification code to determine an abnormal event, and generate an abnormal event data thereby. The memory module is coupled to the CPU for recording the abnormal event information.

The present invention further provides a smart monitoring system including a server and at least one smart endpoint. The server is coupled to a network. One of the at least one smart endpoint is coupled to the server. The endpoint includes a CPU, an interface module, a digital signal processing unit, and a memory module. The interface is coupled to the CPU and at least a sensor, a video camera, and an identification code reader for receiving a plurality of heterogeneous monitoring signals and an identification code. The digital signal processing unit is coupled to the CPU for integrally considering the monitoring signals and the identification code to determine an abnormal event, and generate abnormal event information related the abnormal event thereby. The memory module is coupled to the CPU for recording the abnormal event information.

As taught above, the present invention is adapted to integrate an identification code, e.g., an RFID identification code, a digital video camera, sensors, or other personal wireless apparatuses, as well as the functions of image identification and digital signal processing. In such a way, sensors and video cameras of the video monitoring systems can be made smart, the instant image processing capability of the video monitoring system can be improved, and the application of integrating different kinds of identification sensors can be enhanced.

Further, having the wireless transmission capability, the present invention is adapted to drastically upgrade the smartness level of the monitoring systems, in which not only the responding efficiency of the video and sensing monitoring network can be improved, but also relieves the load of network bandwidth. It may further serially connect different kinds of heterogeneous networks via the internet to achieve an optimal ubiquitous network.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
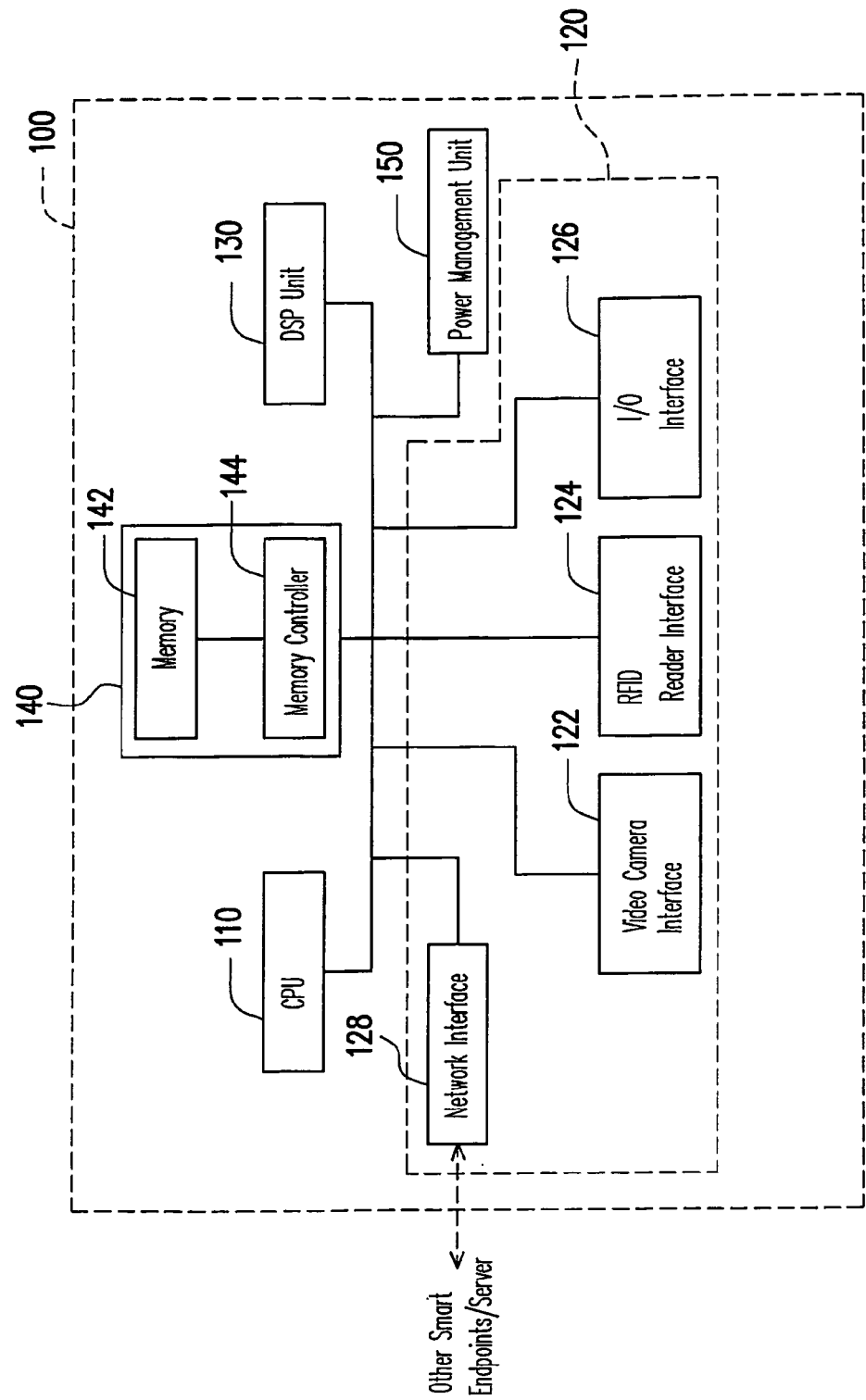
FIG. 1 is a schematic block diagram illustrating a smart endpoint according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram illustrating a smart endpoint according to an embodiment of the present invention. Referring to FIG. 1, the smart endpoint 100 includes a central processing unit (CPU) 110, an interface module 120, a digital signal processing (DSP) unit 130, and a memory module 140.

The CPU 110 is provided for controlling operations of other components in the entire smart endpoint 100.

The interface module 120 is coupled to the CPU 110, and configured for receiving a plurality of heterogeneous monitoring signals and an identification code. In details, the interface module 120 is provided serving as an interface for connecting with an external monitoring (sensing) apparatus or other devices, and receiving the heterogeneous monitoring signals and the identification code via the external monitoring (sensing) apparatus or devices. According to an aspect of the embodiment, the interface module 120 includes a video camera interface 122, an identification code reader interface 124, and an input/output (I/O) interface 126.

The video camera interface 122 is provided for connecting with one or more video cameras (not shown). The video camera interface 122 is adapted to provide video signals captured by the video cameras to the digital signal processing unit 130 for serving as the foregoing monitoring signals.

According to an embodiment of the present invention, the identification code reader interface 124 is a radio frequency identification (RFID) reader interface, adapted for connecting with an RFID reader (not shown) for receiving an RFID code transmitted by a user via an active RFID tag. According to an aspect of the embodiment, the RFID code can be a high frequency RFID code.

The I/O interface 126 is configured for connecting with one or more same or different sensor(s) (not shown), and receiving sensing signals from the sensors for serving as the foregoing monitoring signals. The sensors that can be connected with the I/O interface 126 include smoke or gas sensor, temperature sensor, motion or vibration sensor, sound sensor, light sensor, or power sensor.

In the embodiment of the present invention, the video camera interface 122, the identification code reader interface 124, and the I/O interface 126 can be connected with peripheral apparatuses (sensors, video cameras, and identification code readers) by wireless connections. However, according to another embodiment of the present invention, the video camera interface 122, the identification code reader interface 124, and the I/O interface 126 also can be connected with peripheral apparatuses by wire connections.

According to as aspect of the embodiment, the interface module 120 further includes a network interface 128, provided for connecting to another smart endpoint or a server. In other words, when the smart endpoint 100 is operated in a non-single machine manner, it can communicate with another endpoint or the server via the network interface 128. According to an aspect of the embodiment, the network interface is a wireless interface module. According to another aspect of the embodiment, the network interface can also be a wire interface module.

The DSP unit 130 is coupled to the CPU 110, and receives the RFID codes and the monitoring signals from the video camera interface 122, the identification code reader interface 124, and the I/O interface 126. Specifically, the DSP unit 130 is configured for tagging corresponding RFID code tags to the monitoring signals so as to allow the received monitoring signal to be identified. Further, the DSP unit 130 is used for integrating the plurality of monitoring signals and the corresponding RFID codes for determining whether there is any abnormal event occurred, and generating an abnormal event data when there is an abnormal event occurred.

The memory module 140 is coupled to the CPU 110, for storing the foregoing monitoring signals and the corresponding RFID codes, as well as the abnormal event information generated by the DSP unit 130. The memory module 140 includes a memory 142 and a memory controller 144. The memory 142 is provided for storing data, e.g., monitoring signal, RFID codes, and abnormal event information. The memory controller 144 is coupled between the CPU 110 and memory 142 for controlling the memory 142. In the embodiment of the invention, the memory 142 is a flash memory. However, in another embodiment, the memory 142 can also be an erasable and a programmable read only memory (EPROM), a synchronous dynamic random access memory (SDRAM), or other suitable memories.

Further, the smart endpoint 100 may also include basic functional components of a conventional endpoint. For example, the smart endpoint 100 may include a power management unit 150 for providing power to the smart endpoint 100.

As such, the endpoint 100 according to the present invention is adapted for identifying a status of an object being monitored according to a plurality of different monitoring signals, and thus achieving a smart monitoring performance.

According to another embodiment of the present invention, the smart endpoint 100 further includes a communication unit (not shown). When it is determined that an abnormal event occurs, the smart endpoint 100 transmits an abnormal event information (or message) to a terminal of a user corresponding to the object being monitored according to the identification code via the communication unit.

A parking lot being monitored is to be taken as an example for illustrating one of applications of the smart endpoint 100 according to the present invention below. However, it should be understood that the present invention should not be restricted as applying to parking lots, while many other different sites and locations can also be applied with the smart endpoint 100.

Figure 2:
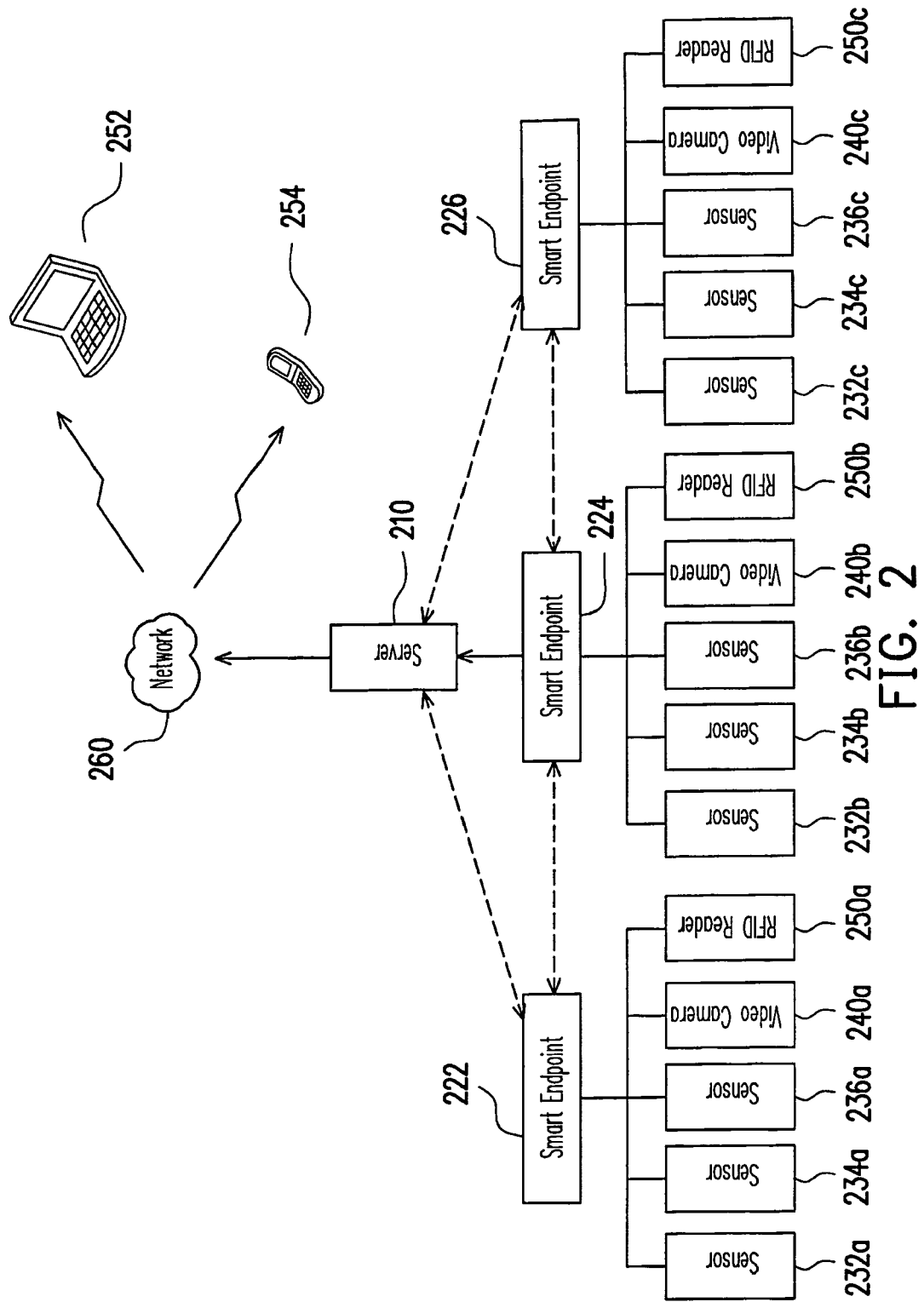
FIG. 2 a schematic block diagram illustrating a smart monitoring system according to an embodiment of the present invention.

FIG. 2 a schematic block diagram illustrating a smart monitoring system according to an embodiment of the present invention.

Referring to FIG. 2, there is shown a smart monitoring system 200 including a server 210, a plurality of smart endpoints 222, 224, and 226. The smart monitoring system 200 further includes sensors 232a, 234a, 236a, a video camera 240a, and an RFID reader 250a, all of which are connected with the smart endpoint 222; sensors 232b, 234b, 236b, a video camera 240b, and an RFID reader 250b, all of which are connected with the smart endpoint 224; and sensors 232c, 234c, 236c, a video camera 240c, and an RFID reader 250c, all of which are connected with the smart endpoint 226. Further, the smart monitoring system 200 may further includes a network 260 and user terminals 252 and 254.

The server 210 is provided for harmonizing the operations of all of the smart endpoints 222, 224, and 226 in the smart monitoring system 200, and processing any abnormal event information generated by any of the smart endpoints 222, 224, and 226, e.g., transmitting the abnormal event information to the user terminals 252 and 254 via the network 260. Further, the server 210 can also be provided for executing the management of the site being monitored, data storage, and accounting management. For example, the server 210 can be used for calculating the time of a vehicle parked in the parking lot according to the time of an object being monitored, and according to which for calculating the parking fee.

The smart endpoints 222, 224, and 226 are equivalent with the smart endpoint 100 of FIG. 1 as they having same structures and functions, and thus the detail related to the smart endpoints 222, 224, and 226 are omitted. As described above, each of the smart endpoints 222, 224, and 226 similarly includes the interface module for connecting with sensors, the video camera, and the RFID reader as taught above. In the current embodiment, the sensors 232a, 232b, and 232c are smoke sensors for detecting a smoke status of a region around a vehicle of a user as a smoke monitoring signal. The sensors 234a, 234b, and 234c are temperature sensors, for detecting a temperature status of a region around the vehicle of the user as a temperature monitoring signal. The sensors 236a, 236b, and 236c are sound sensors, for detecting a sound status of a region around the vehicle of the user as a sound monitoring signal. It should be noted that the smart monitoring system according to the present invention is exemplified hereby as having three smart endpoints while each smart endpoints includes three sensors. However, the amount of the endpoints employed therein and the amount of the sensors included by any of the endpoints are not restricted hereby, while they can be determined according to the size of the region to be monitored and the sensing scope of each sensor.

The video cameras 240a, 240b, and 240c are preferably for capturing images of the vehicle of the user parked in the parking lot as an image monitoring signal.

The RFID readers 250a, 250b, and 250c are provided for reading RFID codes of the user. Specifically, after the vehicle is parked, the RFID readers 250a, 250b, and 250c can read the RFID codes of the user from an active RFID tag (or a passive RFID tag) held by the user.

As such, the smart endpoints 222, 224, and 226 tag the received monitoring signals with the received RFID codes for identifying the monitoring signals. In other words, when the user parks the vehicle and initiates the active RFID tag, while if the RFID reader 250a receives the RFID code of the user, the endpoint 222 corresponding to the RFID reader 250a will correlate all monitoring signals including smoke monitoring signals, temperature monitoring signals and sound monitoring signals with respect to a region around where the active RFID tag is initiated (i.e. where the vehicle is parked) subsequently received from the sensors 232a, 234a, and 236a and the video camera 240a, with the received RFID code. In such a way, the monitoring signals can be identified according to the received RFID code. As such, the smart endpoint can integrally determine whether there is any abnormal event occurs according to a plurality of monitoring signals regarding a certain vehicle being monitored.

Figure 3:
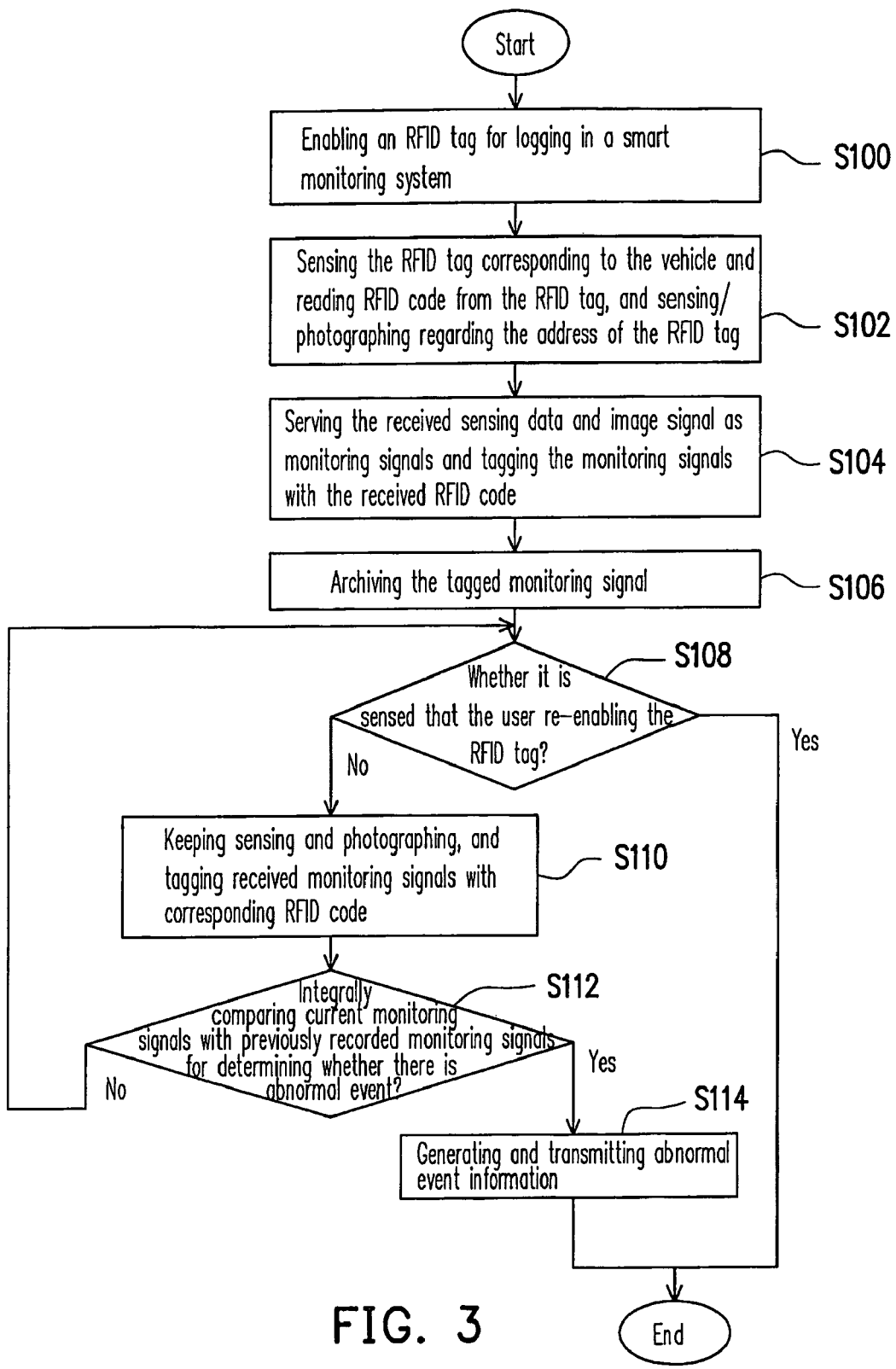
FIG. 3 is a flow chart illustrating the application of the smart monitoring system according to an embodiment of the present invention.

FIG. 3 is a flow chart illustrating the application of the smart monitoring system 200 according to an embodiment of the present invention.

Referring to FIG. 3, after the user drives his vehicle into the parking lot and parks his vehicle therein, at step S100, he operates his active RFID tag so as to log in a nearest smart monitoring system 200.

Then at step S102, an RFID reader of the smart endpoint, e.g., 224 senses the RFID tag corresponding to the vehicle (or the user) and reads the RFID code from the RFID tag, and therefore the smart endpoint controls corresponding sensors and video camera to sense and photograph regarding the address of the RFID tag. Then, at step S104, the sensed data and the photographed image signals are served as monitoring signals and tagged or correlated with the received RFID code. The tagging operation is processed by the DSP unit of the smart endpoint.

At step S106, the tagged monitoring signals are archived for determining abnormal events later. At step S108, it is determined whether it is sensed that the user reinitiates the active RFID tag. If the active RFID tag is not sensed at step S108, then at step S110, the sensors and video camera of the corresponding endpoint of the smart monitoring system 200 keep sensing and photographing, and keep tagging the received monitoring signals with the corresponding RFID code. Then, at step S112, a plurality of current received monitoring signals are integrally compared with previously recorded monitoring signals for determining whether there is any abnormal event occurring. If it is determined at step S112 that there is an abnormal event occurring, at step S114, abnormal event information is transmitted to the server 210 to execute a subsequent abnormal event processing, such as informing the owner of the vehicle.

It should be noted that, when performing the foregoing steps, by tagging the monitoring signals with the RFID code, the DSP unit 110 can perform a searching procedure, and execute an accurate judgment about any event happened to the vehicle being monitored.

For example, if the sensor 236a of the smart endpoint 222 detects a high decibel sound around the position of the vehicle corresponding to the specific RFID code, and the smart endpoint 222 identifies that a door of the monitored vehicle is opened from the received image signal from the video camera 240a, while the RFID reader 250a of the smart endpoint 222 fails to receive the RFID tag, the smart endpoint 222 may integrally considering the foregoing information and thus concluding that there is unauthorized individual open the door of the vehicle, and therefore triggering an abnormal event of an alarm. In other words, the smart endpoint 222 can generate abnormal event information according to the determination result. The abnormal event information is then transmitted to the user (owner of the vehicle) via the server 210. The server 210 transmits the abnormal event information via the network 260 to a user terminal corresponding to the RFID code, e.g., a personal computer PC 252 or a cell phone 254.

Referring to FIG. 3 again, if at step S108, the active RFID tag is sensed again, the smart monitoring system 200 determines that the user is going to log out, and thus suspending all monitoring operations. In other words, after initiating the monitoring operation with the RFID tag and before sensing the RFID tag again, during which the user is considered as remained in the monitoring system, the smart monitoring system 200 keeps performing the corresponding monitoring operation with the RFID code. In such a way, during the period the vehicle parked in the parking lot, the smart monitoring system 200 can effectively monitor the vehicle for avoiding any abnormal event to happen.

It should be noted that the smart endpoints 222, 224, and 226 not only can transmit abnormal event information to the server, but also are configured for cooperative processing by communications therebetween. For example, if the monitored vehicle is unfortunately stolen and driven away from the region monitored by the smart endpoint 224, the smart endpoint 224 can transmit the corresponding RFID code to adjacent the smart endpoints 222 and 226. The adjacent smart endpoints 222 and 226 may keep monitoring the stolen vehicle. In such a way, a manager of the smart monitoring system 200 can be instantly aware of the location of the stolen vehicle, and executes suitable responses, or head off the stolen vehicle before it arrives the gate of the parking lot. By then, a smart management of the parking lot is achieved.

Further, in the current embodiment, the smart endpoints 222, 224, and 226 transmit the abnormal event information to the terminals of the user (owner of the vehicle) via the server 210. However, in another embodiment, the endpoints 222, 224, and 226 include a communication unit (not shown) for directly transmitting the abnormal event information to the terminals of the user (owner of the vehicle).

Furthermore, it should be understood that although the smart monitoring system 200 according to the present invention is exemplified with the application in a parking lot, the present invention is not to be restricted as exemplified thereby, and it can also be applied in communities, building etc.

In summary, upon the employment of the smart endpoint and the smart monitoring system according to the present invention, the DSP unit is configured for integrally considering data received from a plurality of sensors, RFID readers, video cameras to determine an occurrence of an abnormal event, by which the passive monitoring can be upgraded to an active monitoring and analyzing, and thus achieving a smart monitoring.

Moreover, the foregoing smart endpoints can be performed with a RFID code tagging process by the DSP unit, and therefore the backside server can obtain a parking status of the vehicle being monitored in the parking lot, e.g., parking days and hours, and thus automatically calculating the related parking fee and processing the accounting management, so as to improve the parking lot management efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A smart endpoint, comprising:
a central processing unit (CPU);
an interface module, coupled to the CPU, further comprising
a video camera interface configured to receive external monitoring signal;
an rfid reader interface configured to receive external rfid code;
an input/output interface configured to receive external sensing signal; and
a network interface configured to communicate with other endpoint or server;
a digital signal processing unit coupled to the CPU and the interface module, is configured to be enabled by an rfid tag which has been operated to log in the smart endpoint, to receive and tag the signals in regard to the address of the rfid tag with its authorized rfid code, and identify these signals with previously recorded signals to determine whether there is an abnormal event, if yes, generate an event information, otherwise keep receiving, tagging and identifying the signals, wherein when sensing the rfid code of the rfid tag again, the digital signal processing unit suspends all monitoring operations;
a memory module coupled to the CPU, is configured to store the tagged signals and the event information; and
a power management unit configured to provide power to the smart endpoint.

2. The smart endpoint according to claim 1, further comprising a communication unit for transmitting the event information to a user terminal corresponding to the rfid code.

3. A smart monitoring system comprising:
a server coupled to a network; and
at least one smart endpoint coupled to the server, further comprising:
a central processing unit (CPU);
an interface module coupled to the CPU, further comprising
a video camera interface configured to receive external monitoring signal;
a rfid reader interface configured to receive external rfid code;
an input/output interface configured to receive external sensing signal; and
a network interface configured to communicate with other endpoint or server;
a digital signal processing unit coupled to the CPU and the interface module, is configured to be enabled by an rfid tag which has been operated to log in the smart endpoint, to receive and tag the signals in regard to the address of the rfid tag with its authorized rfid code, and identify these signals with previously recorded signals to determine whether there is an abnormal event, if yes, generate an event information, otherwise keep receiving, tagging and identifying the signals, wherein when sensing the rfid code of the rfid tag again, the digital signal processing unit suspends all monitoring operations;
a memory module coupled to the CPU, is configured to store the tagged signals and the event information; and
a power management unit configured to provide power to the smart endpoint.

4. The smart monitoring system according to claim 3, further comprising a communication unit coupled to the network to transmit the event information to a user terminal corresponding to the rfid code.

5. A smart monitoring method, comprising the steps of:
using a rfid tag to log in a smart endpoint to enable a digital signal processing unit of the smart endpoint;
sensing an external rfid code of the rfid tag and identifying the rfid code whether is authorized, if yes, continue the next step, otherwise keep sensing;
receiving external signals corresponding to the address where the rfid code is sensed, and tagging these signals with the rfid code;
archiving these tagged signals;
identifying currently tagged signals with archived signals, and determining whether there is an abnormal even, if yes, generate an even information, otherwise keep identifying the signals; and
if the rfid code of the rfid tag is sensed again, suspending all monitoring operations.

6. The smart monitoring method according to claim 5, further comprising the step of p1 transmitting the event information to a user terminal corresponding to the rfid code.

* * * * *